United States Patent
Poduri et al.

(10) Patent No.: US 10,818,052 B2
(45) Date of Patent: *Oct. 27, 2020

(54) SELECTING AN ANOMALY FOR PRESENTATION AT A USER INTERFACE BASED ON A CONTEXT

(71) Applicant: Oracle International Corporation, Redwood Shores, CA (US)

(72) Inventors: Kusumaharanadh Poduri, Foster City, CA (US); Arvind Kumar Maheshwari, Pleasanton, CA (US); Raghav Ravichandran, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,390

(22) Filed: Aug. 23, 2019

(65) Prior Publication Data

US 2019/0378313 A1    Dec. 12, 2019

Related U.S. Application Data

(63) Continuation of application No. 15/379,106, filed on Dec. 14, 2016, now Pat. No. 10,445,907.

(60) Provisional application No. 62/396,000, filed on Sep. 16, 2016.

(51) Int. Cl.
*G06T 11/20* (2006.01)
*H04L 12/26* (2006.01)

(52) U.S. Cl.
CPC .......... *G06T 11/206* (2013.01); *H04L 43/045* (2013.01)

(58) Field of Classification Search
CPC .................................................... G06T 11/206
See application file for complete search history.

(56) References Cited

U.S. PATENT DOCUMENTS

| | | |
|---|---|---|
| 9,015,536 B1 * | 4/2015 | Ricken ................ G06F 11/0709 714/47.3 |
| 9,558,056 B2 | 1/2017 | Sasturkar et al. |
| 9,575,828 B2 | 2/2017 | Agarwal et al. |
| 9,632,858 B2 | 4/2017 | Sasturkar et al. |
| 9,639,580 B1 | 5/2017 | Xing |
| 2015/0039749 A1 * | 2/2015 | Kwan ................... H04L 43/067 709/224 |

(Continued)

*Primary Examiner* — David E Choi
(74) *Attorney, Agent, or Firm* — Invoke

(57) ABSTRACT

Techniques for selecting an anomaly based on a context are disclosed. A set of metrics corresponding to communications with nodes of a computer system are identified. A set of insights are generated based on the set of metrics. A context for determining a primary anomaly is determined. A subset of metrics associated with the context are identified. A subset of insights that are generated based on the subset of metrics are identified. An insight is selected from the subset of insights as the primary anomaly. A visualization associated with the primary anomaly is presented at a user interface. One or more secondary anomalies may be concurrently presented with the visualization. Additionally, the primary anomaly, the selected visualization, and/or the secondary anomaly is used to determine a new context for selecting another primary anomaly. Hence, a series of primary anomalies may be selected, each primary anomaly being related to each other.

20 Claims, 8 Drawing Sheets

(56) References Cited

U.S. PATENT DOCUMENTS

2016/0147583 A1     5/2016   Ben et al.
2018/0082449 A1*   3/2018   Poduri ................. H04L 43/045

* cited by examiner

US 10,818,052 B2

SELECTING AN ANOMALY FOR PRESENTATION AT A USER INTERFACE BASED ON A CONTEXT

INCORPORATION BY REFERENCE; DISCLAIMER

Each of the following applications are hereby incorporated by reference: application Ser. No. 15/379,106 filed on Dec. 14, 2016; application No. 62/396,000, filed Sep. 16, 2016, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to anomalies regarding nodes of a computer system. In particular, the present disclosure relates to selecting an anomaly for presentation at a user interface based on a context.

BACKGROUND

A computer system includes various tiers, each tier including various nodes. As an example, a computer system may include an application tier, a middleware tier, and a database tier. The application tier may include various applications. The middleware tier may include various web servers and/or logic servers. The database tier may include various databases.

Each communication with a node is associated with metrics and/or attributes. A metric includes information that is counted and/or measured for each communication. Examples of metrics include a response time, whether there was an error, and an error type. An attribute includes information about a particular characteristic of a communication with a node. As an example, a particular characteristic of a communication with a node may be a browser that is used to communicate with the node. Attributes of the browser may include a browser family and a browser version. Another characteristic of the communication may be a geographical region from which that communication originated. Attributes of the geographical region may include a continent and a country.

Various trends may exist in the metrics over a time period. Various correlations and/or relationships may exist between the metrics and the attributes gathered from a computer system. Some trends and/or correlations may be useful to developers for identifying problems with the computer system and/or determining improvements to the computer system. However, other trends and/or correlations may be irrelevant to the developers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
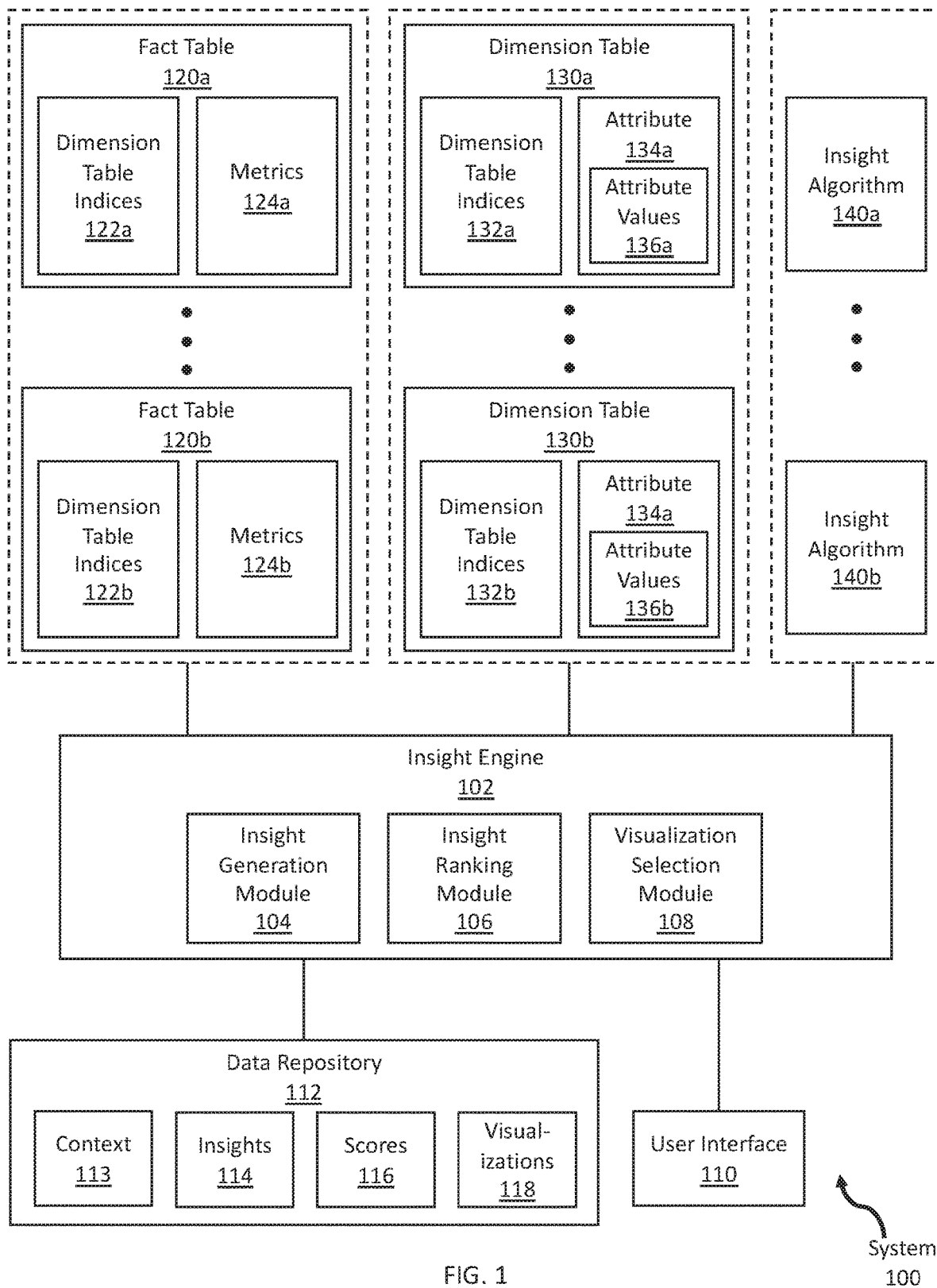
FIG. 1 illustrates a system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ANOMALY DETECTION SYSTEM ARCHITECTURE
3. SELECTING AN ANOMALY FOR PRESENTATION AT A USER INTERFACE BASED ON A CONTEXT
4. EXAMPLE EMBODIMENT
5. MISCELLANEOUS; EXTENSIONS
6. HARDWARE OVERVIEW

1. GENERAL OVERVIEW

One or more embodiments include selecting an anomaly for presentation at a user interface based on a context. A set of metrics corresponding to communications with nodes of a computer system are identified. A set of insights are generated based on the set of metrics. A context for determining a primary anomaly is determined. A subset of metrics associated with the context are identified. A subset of insights that are generated based on the subset of metrics are identified. An insight is selected from the subset of insights as the primary anomaly. A visualization associated with the primary anomaly is selected. The visualization is presented at a user interface. Additionally, one or more secondary anomalies may be concurrently presented with the visualization.

In one or more embodiments, the primary anomaly, the selected visualization, and/or the secondary anomaly is used to determine a new context for selecting another primary anomaly. Hence, a series of primary anomalies may be selected, each primary anomaly being related to each other based on the primary anomaly itself, a visualization associated with the primary anomaly, and/or a secondary anomaly associated with the primary anomaly. In one embodiment, a particular primary anomaly is related to only the immediately preceding primary anomaly. The particular primary anomaly is independent of other primary anomalies that were selected prior to the immediately preceding primary anomaly. In another embodiment, a particular primary anomaly is related to each preceding primary anomaly. As an example, a first context may be determined based on a first primary anomaly. A second primary anomaly may be selected based on the first context. A second context may be determined based on the secondary primary anomaly. A third primary anomaly may be selected based on both the first context and the second context.

In an embodiment, a secondary anomaly, associated with a primary anomaly, is determined based on a same context that was used for determining the primary anomaly. In another embodiment, a primary anomaly is determined using a first context. A second context is determined based on the primary anomaly and/or a visualization associated with the primary anomaly. A secondary anomaly is determined based on the second context rather than the first context.

One or more embodiments described in this Specification and/or recited in the claims may not be included in this General Overview section.

2. ANOMALY DETECTION SYSTEM ARCHITECTURE

FIG. 1 illustrates a system, in accordance with one or more embodiments. As illustrated in FIG. 1, an anomaly detection system 100 includes one or more fact tables 120a-b, one or more dimension tables 130a-b, one or more insight algorithms 140a-b, an insight engine 102, a data repository 112, and a user interface 110. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a fact table (such as fact tables 120a-b) stores information corresponding to communications with a node. In an embodiment, a fact table is a log of communications with a node. Each entry in the fact table corresponds to a communication with the node.

Each entry in a fact table includes one or more metrics (such as metrics 124a-b) about a communication with the node. Different fact tables may include different metrics. As an example, a node of a computer system may be an application. Metrics of a fact table for the application may include a page response time, which is an amount of time used for loading a page of the application. Another node of the computer system may be a database. Metrics of a fact table for the database may include a dataset retrieval time, which is an amount of time used for retrieving a dataset from the database. Other examples of metrics include but are not limited to an error count, an error type, and a login count.

Additionally, each entry in a fact table includes one or more dimension table indices (such as dimension table indices 122a-b). An entry in a fact table includes at most one dimension table index for each dimension table (such as dimension tables 130a-b). The dimension table index is an index into an entry of the corresponding dimension table, as further described below.

In one or more embodiments, a dimension table (such as dimension tables 130a-b) stores information corresponding to a particular characteristic of a communication with a node. As an example, one dimension table may store information corresponding to a browser used to communicate with a node. Another dimension table may store information corresponding to a geographical region from which a communication with a node originated. Another dimension table may store information corresponding to a user application engaging in communication with a node.

A dimension table is associated with one or more attributes (such as attributes 134a-b). Each attribute is configured to be populated by a limited set of attribute values (such as attribute values 136a-b). The limited set of attribute values for an attribute may be determined based on user input and/or another application. As an example, an attribute may be a browser family. A limited set of attribute values for the browser attribute may be "Chrome," "Firefox," and "Internet Explorer." Another attribute may be a continent. A limited set of attribute values for the continent attribute may be "North America," "South America," and "Europe." Another attribute may be a user application. A limited set of attribute values for the user application attribute may be "Sales Order Application," and "Payroll Application." As another example, a dimension table may be configured to store information relating to time periods. Attributes of the dimension table may include "Month" and Year." A limited set of attribute values for the "Month" attribute may be the months of a year, such as "January," "February," and "March" A limited set of attribute values for the "Year" attribute may be a series of years, such as "2016," "2015," and "2014." An attribute value for the "Year" attribute may also include a general phrase, such as "Prior to 2014," or "Other." As another example, a dimension table may be configured to store information relating to time periods. An attribute of the dimension table may be "Time Period." A limited set of attribute values for the "Time Period" attribute may include "2016 Quarter 1," "2016 Quarter 2," 2016 Quarter 3," and "2016 Quarter 4."

Each entry in a dimension table is associated with a unique dimension table index (such as dimension table indices 132a-b). The dimension table index is used for indexing from an entry in the fact table to an entry in the dimension table.

Additionally, each entry in a dimension table is associated with one or more attribute values. The entry identifies a set of attribute values corresponding to a particular dimension table index. As an example, a dimension table may store information about a browser used to communicate with a node. One entry may have the dimension table index of "1" and include attribute values, "Chrome" and "Version 32." Another entry may have the dimension table index of "2" and include attribute values, "Chrome" and "Version 34." Another entry may have the dimension table index of "3" and include attribute values, "Internet Explorer" and "Version 8."

The fact tables 120a-b are linked to the dimension tables 130a-b using the dimension table indices. A dimension table index may also be referred to as a "foreign key." As an example, a particular entry in a fact table may include a dimension table index of "2" corresponding to a particular dimension table. The particular dimension table may include information about a browser used to communicate with a node. The particular dimension table may include multiple entries, one of which has the dimension table index of "2." The entry with the dimension table index of "2" may include the attribute values, "Chrome" and "Version 34." Based on this example, the dimension table index is used to join the fact table and the particular dimension table. the particular entry in the fact table is associated with "Chrome" and "Version 34." The communication corresponding to the particular entry in the fact table was made using a browser executing Version 34 of the Chrome browser family.

In alternative embodiments, one or more tables, storing information associated with communications with a node, may be organized according to different schemas, structures, and/or formats. As an example, a single table may store information associated with communications with a particular node. The fields of the table may include metrics and attributes. Examples of schemas, for storing information associated with communications with a node, include a star schema, a snowflake schema, and a third normal form.

In one or more embodiments, an insight algorithm (such as insight algorithms 140$a$-$b$) is an algorithm applied to at least a subset of entries of a fact table with respect to a particular metric of the fact table.

In an embodiment, an insight algorithm analyzes a particular metric over a time period. The insight algorithm may identify trends, irregularities, and/or other information associated with the particular metric over the time period. As an example, an insight algorithm may be used to determine that a particular metric is relatively steady over time. Further, the insight algorithm may be used to determine that there is a sudden spike in the particular metric at a particular time. Based on the insight algorithm, the sudden spike in the particular metric may be determined as an insight associated with the particular metric.

In an embodiment, an insight algorithm is applied to a subset of entries of a fact table with respect to a particular metric, wherein the subset of entries is associated with a particular attribute value. The insight algorithm is referred to herein as being applied to a "metric-attribute value pair," wherein the metric-attribute value pair comprises the particular metric and the particular attribute value. Examples of insight algorithms are provided below. Additional and/or alternative insight algorithms may be used.

An example of an insight algorithm is an aggregation algorithm. An aggregation algorithm, applied to a particular metric and a particular attribute value, computes a ratio of (a) a sum of the particular metric for communications, associated with the particular attribute value, with a particular node to (b) a sum of the particular metric for all recorded communications with the particular node. Expressing the ratio as a percentage, the aggregation algorithm computes a percentage in which communications associated with the particular attribute value contributed to a total value of the particular metric. The percentage may be referred to herein as a "Metric Contribution Percentage."

As an example, a fact table may include four entries, corresponding to four communications with a particular node. A metric of the fact table may be a response time. An attribute of a dimension table indexed into from the fact table may be a browser family. Attribute values of the attribute may include "Chrome" and "Internet Explorer." An aggregation algorithm may be applied to the metric-attribute value pair comprising the response time and "Chrome."

The response times for the four entries may be 0.40, 0.30, 0.35, and 0.50 ms, respectively. A sum of the response times for all recorded communication is 1.55 ms (0.40+0.30+0.35+0.50).

The first and third entries may be associated with the "Chrome" attribute value. The second and fourth entries may be associated with the "Internet Explorer" attribute value. A sum of the response times for communications associated with the "Chrome" attribute value is 0.75 ms (0.40+0.35).

Based on this example, the aggregation algorithm determines that communications associated with the "Chrome" attribute value contributed to 48% (0.75/1.55) of the total response times. The Metric Contribution Percentage of "Chrome" is 48%.

Another example of an insight algorithm is an outlier algorithm. An outlier algorithm, applied to a particular metric and a particular attribute value, computes an average of the particular metric across all recorded communications with a particular node. The outlier algorithm further computes a percentage of communications, associated with the particular attribute value, that have a value for the particular metric that is above the average. The percentage may be referred to herein as a "Metric Outlier Percentage."

As an example, a fact table may include four entries, corresponding to four communications with a particular node. A metric of the fact table may be a response time. An attribute of a dimension table indexed into from the fact table may be a browser family. Attribute values of the attribute may include "Chrome" and "Internet Explorer." An aggregation algorithm may be applied to the metric-attribute value pair comprising the response time and "Chrome."

The response times for the four entries may be 0.40, 0.30, 0.35, and 0.50 ms, respectively. An average of the response times for all recorded communication is 0.3875 ms.

The first and third entries may be associated with the "Chrome" attribute value. The second and fourth entries may be associated with the "Internet Explorer" attribute value. The first entry has a response time of 0.40 ms and is above the average. The third entry has a response time of 0.35 ms and is below the average.

Based on this example, one of two communications associated with the "Chrome" attribute value has a response time that is greater than the average of 0.3875 ms. Converted to a percentage, the percentage of communications associated with the "Chrome" attribute value that have an above-average response time is 50%. The Metric Outlier Percentage of "Chrome" is 50%.

In one or more embodiments, a data repository 112 is any type of storage unit and/or device (e.g., a file system, database, collection of tables, or any other storage mechanism) for storing data. Further, a data repository 112 may include multiple different storage units and/or devices. The multiple different storage units and/or devices may or may not be of the same type or located at the same physical site. Further, a data repository 112 may be implemented or may execute on the same computing system as an insight engine 102. Alternatively or additionally, a data repository 112 may be implemented or executed on a computing system separate from the insight engine 102. A data repository 112 may be communicatively coupled to the insight engine 102 via a direct connection or via a network.

Information describing a context 113, insights 114, scores 116, and visualizations 118 may be implemented across any of components within the system 100. However, this information is illustrated within the data repository 112 for purposes of clarity and explanation.

In one or more embodiments, an insight 114 is an output from the application of an insight algorithm to at least a subset of entries of a fact table with respect to a particular metric of the fact table. As an example, an insight is an output from the application of an insight algorithm to a metric-attribute value pair. As described above, an insight algorithm may be an aggregation algorithm. An insight determined by the aggregation algorithm specifies a percentage in which communications associated with a particular attribute value contributed to a total value of a particular metric. Also described above, an insight algorithm may be an outlier algorithm. An insight determined by the outlier algorithm specifies a percentage of communications associated with a particular attribute value that are associated with an above-average value for a particular metric. In an embodiment, one insight is generated for each unique tuple of metric-attribute value-insight algorithm. One or more insights 114 may be selected as an anomaly, which is presented at a user interface 110.

In one or more embodiments, a context 113 is a scope used for selecting an anomaly from a set of insights 114. Examples of factors included in a context 113 include: (a) a metric associated with a previously-presented anomaly, (b) an attribute value associated with a previously-presented anomaly, (c) an attribute associated with a previously-presented anomaly, (d) a dimension table associated with a previously-presented anomaly, (e) a fact table associated with a previously-presented anomaly, (f) user preferences, (g) user history, (h) information included in a user profile.

In one or more embodiments, a score 116 is a measure of a particular insight's relevancy, importance, and/or value, in comparison to other insights 114. The scores 116 of the insights 114 are used for comparing the relative relevancy, importance, and/or values of the insights 114. In an embodiment, an insight 114 that is associated with a highest score 116, out of a set of insights 114 associated with a particular context 113, is selected as an anomaly.

In one or more embodiments, a visualization 118 is a graph, diagram, and/or figure that is used to visually present an anomaly at a user interface. Examples of visualizations 118 include a bar chart, a pie chart, a histogram, a scatter plot, and a timeline.

In one or more embodiments, a user interface 110 refers to hardware and/or software configured to facilitate communications between a user and an insight engine 102. A user interface 110 renders and/or presents user interface elements. A user interface 110 receives user input via user interface elements. Examples of user interfaces include a graphical user interface (GUI), a command line interface (CLI), an application programming interface (API), a haptic interface, and a voice command interface. Examples of user interface elements include checkboxes, radio buttons, drop-down lists, list boxes, buttons, toggles, text fields, date and time selectors, command lines, sliders, pages, and forms. In an embodiment, a user interface 110 presents an anomaly, selected from a set of insights 114. The user interface 110 may present the anomaly as a visualization 118 and/or using text or other forms.

In one or more embodiments, an insight engine 102 refers to hardware and/or software configured to perform operations described herein for selecting an anomaly for presentation at a user interface based on a context. Examples of operations for selecting an anomaly for presentation at a user interface based on a context are described below with reference to FIGS. 2-4.

In an embodiment, an insight engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and a personal digital assistant ("PDA").

3. SELECTING AN ANOMALY FOR PRESENTATION AT A USER INTERFACE BASED ON A CONTEXT

Figure 2:
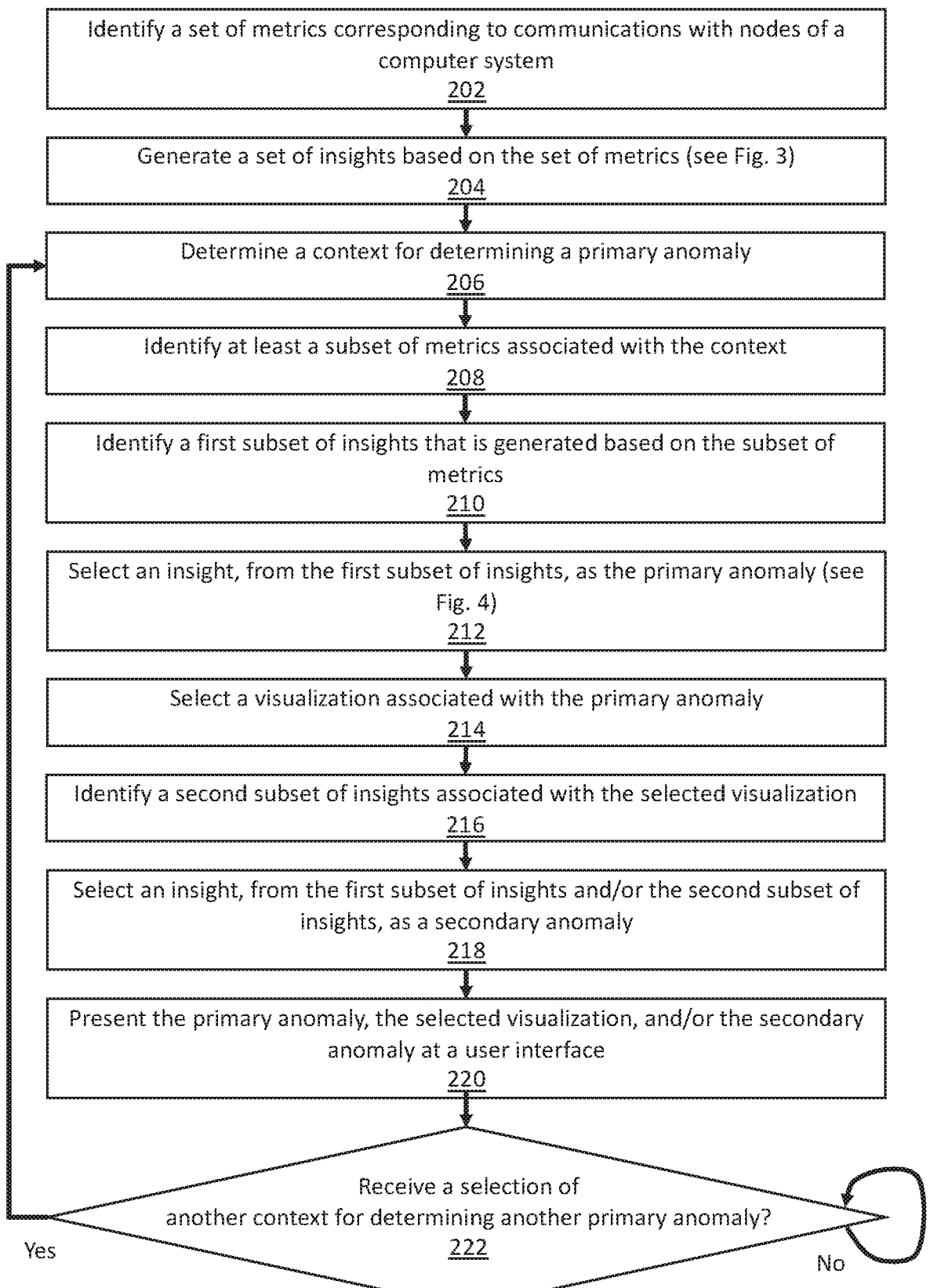
FIG. 2 illustrates an example set of operations for selecting an anomaly for presentation at a user interface based on context, in accordance with one or more embodiments.

FIG. 2 illustrates an example set of operations for selecting an initial insight and/or a linked insight for presentation at a user interface, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include identifying a set of metrics corresponding to communications with one or more nodes of a computer system (Operation 202). The set of metrics may be gathered and/or determined by monitoring communications with the nodes. The set of metrics may be stored in one or more tables, such as fact tables and/or dimension tables.

One or more embodiments include generating a set of insights based on the set of metrics (Operation 204). Various insight algorithms may be used to analyze the set of metrics. Additional and/or alternative insight algorithms, to the insight algorithms described herein, may be used to analyze the set of metrics. An insight may also be referred to herein as a "candidate anomaly."

In an embodiment, an insight algorithm analyzes the set of metrics over time. The insight algorithm determines a deviation in a particular metric over a particular time period. The insight algorithm compares the deviation in the particular metric across different time periods. If the change in the deviation is greater than a specified threshold, then the deviation is identified as an insight associated with the particular metric.

As an example, an insight algorithm analyzes a number of errors occurring over a quarterly time period. 500 errors may occur during Quarter 1. 550 errors may occur during Quarter 2. 560 errors may occur during Quarter 3. 1,200 errors may occur during Quarter 4. The insight algorithm may be used to determine that the increase in errors in Quarter 4 is greater than a specified threshold value. The error count in Quarter 4 may be determined as an insight.

In an embodiment, an insight algorithm is applied to a metric-attribute value pair in order to determine an insight. Examples of operations for applying an insight algorithm to a metric-attribute value are described below with reference to FIG. 3. The operations illustrated in FIG. 3 may be iterated such that each insight algorithm is applied to each metric-attribute value pair. Each application of an insight algorithm a metric-attribute value pair generates one insight.

One or more embodiments include determining a context for determining a primary anomaly (Operation 206). The primary anomaly may be an insight that is the most relevant, important, and/or valuable to a user. The context defines and/or specifies factors that are relevant to determining the primary anomaly.

An insight engine may determine the context based on a user profile of the user. The user profile may include user preferences. Additionally or alternatively, the user profile may include a history of user actions, such as the insights that the user has viewed, the insights that the user has clicked on, and/or the insights that the user has searched for. Additionally or alternatively, the user profile may include a name of the employer of the user, a job title and department of the user, and/or an industry associated with the user.

As illustrated in FIG. 2, and further described below, Operation 206 may be reiterated in response to receiving a selection of another context for determining another primary anomaly at Operation 222. The selection of another context may include selecting a particular metric, a fact table, an attribute value, an attribute, and/or a fact table as a context for determining another primary anomaly. During the reiteration of Operation 206, additional and/or alternative factors for determining a context may be used. The additional and/or alternative factors for determining a context are described below with reference to the reiteration of Operation 206.

In an embodiment, the operation of determining a context is not performed when determining a primary anomaly for a user for the first time. All insights, associated with communications with the nodes of the computer system, may be relevant to the user. Any of the insights may be selected as an anomaly for presentation to the user.

One or more embodiments include identifying at least a subset of metrics associated with the context (Operation 208).

In an embodiment, the context includes a particular metric. The particular metric is identified as a metric associated with the context.

In an embodiment, the context includes a fact table. The metrics associated with the fact table are identified as metrics associated with the context. As an example, a context may be a fact table that stores information associated with communications with a database node. Metrics associated with the fact table may include a response time, and an error count. The response time and error count may be identified as metrics associated with the context.

In an embodiment, the context includes a job title of a user, as indicated by a user profile. The metrics that are relevant to a person of that job title are identified as metrics associated with the context. As an example, a job title of a user may be "Error Analyst." The job title may be used as a context for determining a primary anomaly. Metrics relevant to the job title may include error count and error type. The error count and error type may be identified as metrics associated with the context.

In an embodiment, the context includes an attribute value. The insight engine identifies one or more dimension tables that include an attribute associated with the attribute value. The insight engine identifies one or more fact tables that include a dimension table index into one of the identified dimension tables. The insight engine identifies the metrics, associated with the identified fact tables, as metrics associated with the context. As an example, a context may be the "Safari" browser. A first fact table may include the metrics, error count and page loading time. A second fact table may include the metric, login count. The first fact table includes a dimension table index to an entry, of a dimension table, that is associated with the "Safari" attribute value. The second fact table does not include a dimension table index into an entry, of a dimension table, that is associated with the "Safari" attribute value. Hence, the error count and page loading time metrics may be identified as being associated with the context. The login count metric is not identified as being associated with the context.

In an embodiment, the context includes an attribute. The insight engine identifies one or more dimension tables that include the attribute. The insight engine identifies one or more fact tables that include a dimension table index into one of the identified dimension tables. The insight engine identifies the metrics, associated with the identified fact tables, as metrics associated with the context.

In an embodiment, the context includes a dimension table. The insight engine identifies one or more fact tables that include a dimension table index into the dimension table. The insight engine identifies the metrics, associated with the identified fact tables, as metrics associated with the context.

One or more embodiments include identifying a first subset of insights that is generated based on the subset of metrics (Operation 210). The first subset of insights is identified from the set of insights generated at Operation 204. As an example, one insight may specify that an error count associated with communications with a web server node spiked at 9 am on Sep. 16, 2016. Another insight may specify that communications, with the web server node, originating from Canada contributed to 80% of the total response time. A context for determining an anomaly may include the error count metric but not the response time metric. The insight associated with error count is identified as an insight generated based on a metric associated with the context. The insight associated with response time is not identified as an insight generated based on a metric associated with the context.

In an embodiment, the first subset of insights is further filtered by a subset of attribute values associated with the context. A set of attribute values corresponding to communications with the nodes of the computer system are identified. A subset of attribute values associated with the context are identified. Communications with nodes of the computer system that are associated with the subset of attribute values are identified. The first subset of insights includes insights that are generated based on (a) the subset of metrics associated with the context and (b) the communications associated with the subset of attribute values associated with the context. Hence, each of the first subset of insights is associated with (a) a metric associated with the context and (b) an attribute value associated with the context.

As an example, a set of attribute values corresponding to communications with nodes of a computer system include: "Chrome" and "Internet Explorer." A context, for determining a primary anomaly, may include "Chrome" but not "Internet Explorer."

One fact table may be associated with a database node. The database fact table may include the metric "Response Time." The database fact table may include three entries. The first two entries may be associated with the attribute value "Chrome." The third entry is not associated with the attribute value "Chrome."

Another fact table may be associated with a server node. The server fact table may include the metric "Error Count." The server fact table does not include any entries associated with the attribute value "Chrome."

An insight engine may identify the subset of metrics associated with the context. Since the database fact table includes at least one entry associated with "Chrome," the insight engine may determine that the metric "Response Time" is associated with the context. Since the server fact table does not include any entries associated with "Chrome," the insight engine may determine that the metric "Error Count" is not associated with the context. Hence, the subset of metrics associated with the context includes "Response Time" but not "Error Count."

The insight engine may identify the communications associated with the context. Since the first two entries in the database fact table are associated with "Chrome," the insight engine may determine that the first two entries in the database fact table are associated with the context. Since the third entry in the database fact table is not associated with "Chrome," the insight engine may determine that the third entry in the database fact table is not associated with the context. Hence, the communications associated with the context correspond to the first two entries in the database fact table but not the third entry.

As illustrated in this example, based on the context, the insight engine may select a subset of insights that are generated based on (a) the metric "Response Time," and (b) the communication(s) corresponding to one or both of the first two entries of the database fact table.

One or more embodiments include identifying an insight, from the first subset of insights, as the primary anomaly (Operation 212). The insight engine may compute a score for each of the first subset of insights. Examples of operations for computing a score for an insight are described below with reference to FIG. 4. An insight associated with the highest score may be identified as the primary anomaly.

One or more embodiments include selecting a visualization associated with the primary anomaly (Operation 214).

In an embodiment, a mapping between insight algorithms and visualizations is stored in a data repository. Different visualizations may be used to present insights generated by different insight algorithms.

As described above, an insight algorithm may be used to analyze a metric over time. A visualization associated with the insight algorithm may be a bar chart or a scatterplot, with time on the x-axis. The time unit used on the x-axis is determined based on the time unit used in the insight algorithm. As an example, an insight algorithm may analyze an error count on a quarterly basis. An insight, generated by the insight algorithm, may indicate that there were 1,000 errors in Quarter 4. Based on the insight algorithm, a time unit used on an x-axis of a chart for presenting the insight is a quarter. The chart may show the number of errors occurring in each of Quarter 1, Quarter 2, Quarter 3, and Quarter 4.

As described above, an insight algorithm may be an aggregation algorithm. The aggregation algorithm computes a percentage in which communications associated with a particular attribute value contributed to a total value of a particular metric (the "Metric Contribution Percentage"). A visualization associated with the insight algorithm may be a pie chart. The pie may represent the total value of the particular metric. The visualization may show the Metric Contribution Percentage as a slice of the pie chart. The visualization may show a percentage in which communications associated with another attribute value contributed to the total value of the particular metric as another slice of the pie chart.

As described above, an insight algorithm may be an outlier algorithm. The outlier algorithm computes a percentage of communications, associated with a particular attribute value, that have an above-average value for a particular metric (the "Metric Outlier Percentage"). A visualization associated with the insight may be a scatter plot. The y-axis of the scatter plot may be the particular metric. The x-axis of the scatter plot may be time. Each point on the scatter plot represents a communication associated with the particular attribute value.

The time at which a particular communication occurred is identified. The time is used to identify the x-axis of the point representing the particular communication. Further, the value for the particular metric associated with the particular communication is identified. The value for the particular metric is used to identify the y-axis of the point representing the particular communication.

In an embodiment, a mapping between metrics and visualizations is stored in a data repository. Different visualizations may be used to present insights associated with different metrics. As an example, an insight may be associated with an error count metric. A visualization for the insight may illustrate a breakdown of the error types corresponding to the error count. The visualization may be a bar graph, indicating the number of errors for each error type.

In an embodiment, a mapping between attribute values and visualizations is stored in a data repository. Different visualizations may be used to present insights associated with different attribute values.

As an example, an insight may be associated with a "North America" attribute value. The insight may specify that communications originating from the North America region contributed to 80% of the total response time. A visualization for the insight may be a world map. The North America continent in the map may be labeled with "80%." Additionally, the contributions to the total response time by other geographical regions may be determined. Other continents in the map may be labeled with the respective contributions to the total response time.

As another example, an insight may be associated with a "Sales Application" attribute value. The insight may specify that 75% of communications, using the Sales Application, are associated with an above-average error count. A visualization for the insight may be a topology graph. The topology graph may illustrate the Sales Application as well as other nodes directly and/or indirectly connected to the Sales Application. The Sales Application node, in the topology graph, may be labeled with "75%." Additionally, the percentage of communications, using another node in the topology graph, that are above an average error count may be determined. The other node in the topology graph may be labeled with the determined percentage.

In an embodiment, a visualization, for an insight, is selected based on the spread and/or distribution in the values for a particular metric over different attribute values.

The insight engine determines a particular attribute value and a particular metric associated with the insight to be presented. The insight engine determines a particular attribute associated with the particular attribute value. The insight engine identifies insights associated with each of the attribute values associated with the particular attribute. The insight engine determines whether the values for the particular metric are evenly spread across the communications associated with different attribute values.

As an example, each of a set of insights may be associated with a same attribute but a different attribute value. The set of insights may be generated by an aggregation algorithm. An insight engine may determine that the values for a particular metric are evenly spread across the different attribute values if the Metric Contribution Percentages of the set of insights is within a particular range of each other. For example, an insight may specify that communications originating from North America contributed 53% of the total response time. Another insight may specify that communications originating from South America contributed to 47% of the total response time. A particular range used for determining whether there is an even spread may be 10%. In this example, the Metric Contribution Percentages (53% and 47%) are within a range of 10% from each other. Hence, an insight engine may determine that there is an even spread in the response times across the communications originating from different geographical regions.

As another example, each of a set of insights may be associated with a same attribute but a different attribute value. The set of insights may be generated by an outlier algorithm. An insight engine may determine that the values for a particular metric are evenly spread across the different attribute values if the Metric Outlier Percentages of the set of insights is within a particular range of each other.

If the values for the particular metric are not evenly spread across different attribute values, then a bar chart may be used. Each bar may represent an insight associated with a different attribute value.

In an embodiment, a visualization, for an insight, is selected based on the spread and/or distribution in the values for a particular metric over time.

The insight engine determines a particular attribute value and a particular metric associated with the insight to be presented. The insight engine determines a set of insights, associated with the particular attribute value and the particular metric, over a particular time period. If the range of values for the particular metric, over the particular time period, is greater than a specified threshold value, then the insight engine selects a timeline for presenting the insight. The insight engine plots the set of insights over the timeline. The timeline illustrates the variations and/or fluctuations in the particular metric over time.

One or more embodiments include identifying a second subset of insights associated with the selected visualization (Operation 216). The second subset of insights may be but is not necessarily associated with the context used for determining the primary anomaly. As an example, a primary anomaly may be that communications using a Tax Application contribute to 75% of the total error count. A visualization associated with the primary anomaly may illustrate the number of errors associated with communications using the Tax Application over a time period. The visualization may show that 500 errors occurred in July, 600 errors occurred in August, and 700 errors occurred in the current month of September. A factor associated with visualization may be the month of September. An insight engine may identify a subset of insights associated with the visualization. Based on the visualization, a subset of insights generated based on metrics measured in September may be identified. The subset of insights may include (a) a number of new user registrations in September, and (b) a number of servers executing the Tax Application in September. In this example, the subset of insights is associated with the visualization. However, the subset of insights is not necessarily associated with the primary anomaly and/or the context for determining the primary anomaly.

One or more embodiments include selecting an insight, from the first subset of insights and/or the second subset of insights, as a secondary anomaly (Operation 218).

In an embodiment, the secondary anomaly is selected based on a same context as that of the primary anomaly. Since the first subset of insights are identified based on the context for determining the primary anomaly, the first subset of insights may also be used for selecting the secondary anomaly. As described above, the insight engine computes scores corresponding to the first subset of insights. While an insight associated with the highest score may be identified as the primary anomaly, an insight associated with the second highest score is identified as the secondary anomaly.

In an embodiment, the secondary anomaly is selected based on a visualization presenting the primary anomaly. As described above, the second subset of insights are identified as being associated with the visualization. The insight engine computes scores corresponding to the second subset of insights. Examples of operations for computing a score for an insight are described below with reference to FIG. 4.

An insight associated with the highest score, out of the second subset of insights, is identified as the secondary anomaly.

Operations 204-212 may be referred to herein as a deterministic process for selecting a primary anomaly. The deterministic process is based on, for example, generating a plurality of insights based on one or more insight algorithms, and scoring the plurality of insights based on one or more scoring algorithms. The insight algorithms and the scoring algorithms results in a deterministic selection of the primary anomaly.

In an embodiment, the same deterministic process may be used in selecting a secondary anomaly. The same plurality of insights generated for selecting the primary anomaly may be used for selecting the secondary anomaly. Additionally or alternatively, the same scores corresponding to the plurality of insights computed for selecting the primary anomaly may be used for selecting the secondary anomaly.

In another embodiment, a different deterministic process may be used in selecting a secondary anomaly. Different deterministic processes may take into account different factors. As an example, different metrics, attribute values, insight algorithms, and/or scoring algorithms may be used. As another example, one deterministic process may not take into account a user profile, while another deterministic process may take into account a user profile.

The two deterministic processes, for selecting the primary anomaly and the secondary anomaly respectively, may generate different pluralities of insights. The primary anomaly is selected from a plurality of insights generated by one deterministic process, while the second anomaly is selected from a different plurality of insights generated by another deterministic process. Additionally or alternatively, the two deterministic processes may compute different scores for a plurality of insights. The primary anomaly is selected based on a set of scores computed by one deterministic process, while the secondary anomaly is selected based on a different set of scores computed by another deterministic process.

One or more embodiments include presenting the primary anomaly, the selected visualization, and/or the secondary anomaly at a user interface (Operation 220). As an example, the selected visualization may be presented at the user interface. Additionally, the primary anomaly and the secondary anomaly may be presented as text at the user interface. The selected visualization, the primary anomaly, and/or the secondary anomaly may be concurrently presented at the user interface.

One or more embodiments include determining whether a selection of another context for determining another primary anomaly has been received (Operation 222). The selection of another context may include a selection of a particular factor associated with the primary anomaly, the visualization, and/or the secondary anomaly presented at the user interface. The particular factor may be, for example, an attribute value, a metric, an attribute, a dimension table, and/or a fact table. The selection is received via the user interface.

In an embodiment, the selection of another context may include a selection of a part of a textual representation of a primary anomaly and/or a secondary anomaly. The selected part of a textual representation of a primary anomaly and/or a secondary anomaly is used to determine a context for determining another primary anomaly. As an example, a textual representation of a primary anomaly may state, "80% of errors are coming from North America." "80% of errors" may be one selectable part of the textual representation. "North America" may be another selectable part of the textual representation. If "80% of errors" is selected, then the "error count" metric may be used as a context for determining another primary anomaly. If "North America" is selected, then the "North America" attribute value may be used as a context for determining another primary anomaly.

As described above, a primary anomaly is associated with a particular metric. The particular metric itself and/or a fact table including the particular metric may be used as a context for determining another primary anomaly.

As described, a primary anomaly may be associated with a particular attribute value. The particular attribute value itself, an attribute associated with the particular attribute value, and/or a dimension table including the attribute associated with the particular attribute value may be used as a context for determining another primary anomaly.

As an example, a current primary anomaly may specify that communications using a "Chrome" browser contributed to 35% of the error count. "Chrome" is an attribute value associated with the browser family attribute. A user may select the browser family attribute as a context for determining a next primary anomaly.

If a selection of another context for determining another primary anomaly has been received, then the insight engine reiterates the operation of determining a context for determining a primary anomaly (Operation 206). As described above, a particular factor associated with the current primary anomaly, the current visualization, and/or the current secondary anomaly may be determined as a context for determining a next primary anomaly.

The insight engine reiterates Operations 206-220 to determine and present another primary anomaly, another visualization, and/or another secondary anomaly. The currently-presented primary anomaly is related to the previously-presented primary anomaly by a particular factor associated with the previously-presented primary anomaly. The currently-presented primary anomaly may be related to the previously-presented primary anomaly by being directly related to the previous-presented primary anomaly itself, or by being related to a visualization and/or a secondary anomaly associated with the previously-presented primary anomaly. Further, the insight engine reiterates Operation 222 to determine whether a selection of another context for determining yet another primary anomaly is received.

Based on the reiteration of Operations 206-222, a series of primary anomalies may be presented. Each primary anomaly is related to a previously-presented primary anomaly. In one embodiment, a particular primary anomaly is related to only the immediately preceding primary anomaly. The particular primary anomaly is independent of other primary anomalies that were selected prior to the immediately preceding primary anomaly. In another embodiment, a particular primary anomaly is related to each preceding primary anomaly. As an example, a first context may be determined based on a first primary anomaly. A second primary anomaly may be selected based on the first context. A second context may be determined based on the secondary primary anomaly. A third primary anomaly may be selected based on both the first context and the second context.

As described above, Operations 204-212 may be referred to herein as a deterministic process for selecting a primary anomaly. Operation 204 may be initially performed to generate a set of insights. Operations 206-212, which form a portion of the deterministic process, may be reiterated to determines a series of primary anomalies from the set of insights. Each primary anomaly is related to a previously-presented primary anomaly.

Examples for reiterating the operation for identifying a subset of insights that are generated based on a subset of metrics associated with a context (Operation 210) are described below.

As an example, a first primary anomaly may specify that communications using a "Chrome" browser contributed to 35% of the error count. The attribute value, "Chrome," may be selected as a new context for determining a second primary anomaly. An insight engine may select a subset of insights that are associated with the "Chrome" attribute value. The subset of insights may include an insight specifying that 35% of communications using a "Chrome" browser are associated with an above-average response time. The subset of insights may also include an insight specifying that communications using a "Chrome" browser contributed to 40% of the total response time. However, the subset of insights does not include an insight specifying that communications using a "Safari" browser contributed to 20% of the total response time. The insight engine may select the second primary anomaly from the subset of insights. Each of the subset of insights is related to the new context, which is the "Chrome" attribute value associated with the first primary anomaly.

As another example, a first primary anomaly may specify that communications using a "Chrome" browser contributed to 35% of the error count. The attribute, browser family, may be selected as a new context for determining a second primary anomaly. An insight engine may select a subset of insights that are associated with the browser family attribute. The subset of insights may include an insight specifying that communications using an "Internet Explorer" browser contributed to 60% of the error count. The subset of insights may also include an insight specifying that communications using a "Safari" browser contributed to 50% of the total response time. However, the subset of insights does not include an insight specifying that communications originating from Canada contributed to 50% of the total user logins. The insight engine may select the second primary anomaly from the subset of insights. Each of the subset of insights is related to the new context, which is the browser family attribute associated with the first primary anomaly.

In an embodiment, in reiterating the operation of selecting an insight as a primary anomaly (Operation 212), the scores of insights determined during a previous iteration are re-used. An example process for selecting a primary anomaly based on previously-determined scores is described below. An insight engine generates a set of insights at Operation 204. The insight engine determines a score for each of the set of insights. The insight engine identifies a subset of insights associated with a particular context at Operations 206-210. The insight engine selects an insight, from the subset of insights, that is associated with the highest score as a first primary anomaly at Operation 212. Subsequently, the insight engine receives a selection of a new context for determining a second primary anomaly at Operation 222. The insight engine reiterates Operations 206-210 to identify s a new subset of insights associated with the new context. The insight engine selects an insight, from the new subset of insights, that is associated with the highest score as a second primary anomaly at Operation 212. Operation 212 is performed based the scores previously computed for the set of insights.

In an embodiment, in reiterating the operation of selecting an insight as a primary anomaly (Operation 212), the scores of insights determined during a previous iteration are not re-used. The insight engine computes new scores for the insights. The new scores may be determined based on different weights. A weight may be determined based on a previously-presented primary anomaly. As an example, a greater weight may be applied to an insight that is associated with a same factor as a previously-presented primary anomaly than an insight that is not associated with any factor of a previously-presented primary anomaly. The insight engine uses the new weights to select the primary anomaly.

The insight engine determines a weight, to be applied to a global score associated with a particular insight, based on a particular metric associated with the particular insight. If the particular insight is associated with the same metric as a previously-presented primary anomaly, then a greater weight is applied. If the particular insight is associated with a different metric than the previously-presented primary anomaly, then a lesser weight is applied.

Additionally or alternatively, the insight engine determines a weight, to be applied to a global score associated with a particular insight, based on a particular attribute value associated with the particular insight. If the particular insight is associated with the same attribute value as a previously-presented primary anomaly, then a greater weight is applied. If the particular insight is associated with a different attribute value than the previously-presented primary anomaly, then a lesser weight is applied.

A. Applying an Insight Algorithm to a Metric-Attribute Value Pair

Figure 3:
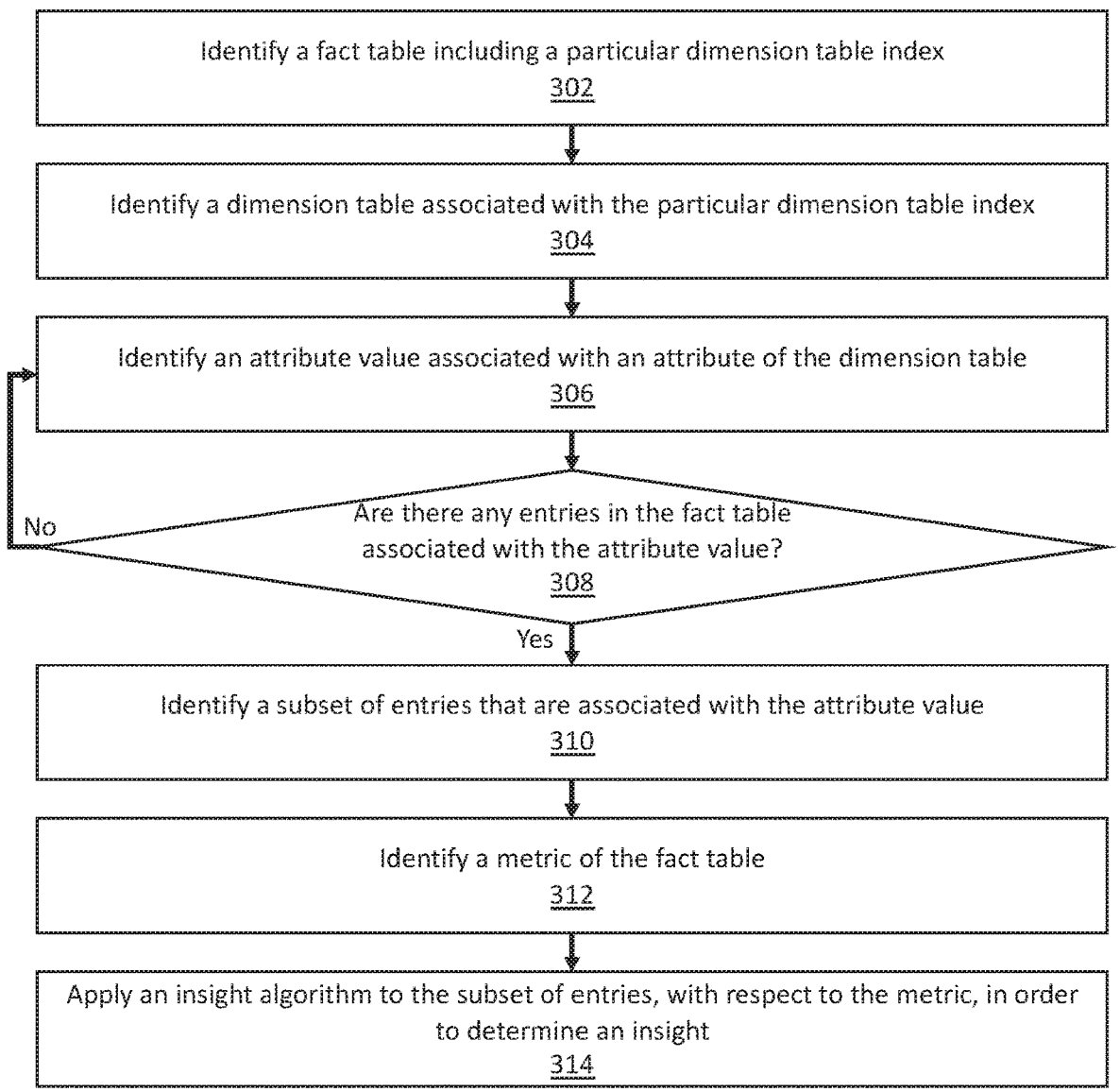
FIG. 3 illustrates an example set of operations for applying an insight algorithm to a metric-attribute value pair to obtain an insight, in accordance with one or more embodiments.

Referring to FIG. 3, an example set of operations for applying an insight algorithm to a metric-attribute value pair is illustrated. As described, additional and/or alternative insight algorithms may be used. As an example, an insight algorithm that analyzes a metric over time may be used.

One or more embodiments include identifying a fact table (Operation 302). A set of one or more fact tables are used to record communications with a set of nodes of a computer system. The insight engine identifies one of the set of fact tables. The insight engine performs Operations 302-214 with respect to the identified fact table.

The insight engine may reiterate Operation 302 to identify each of the set of fact tables. At each reiteration of Operation 302, Operations 304-314 are also reiterated with respect to each of the set of fact tables.

One or more embodiments include identifying a dimension table that is indexed into from the fact table (Operation 304). The fact table includes dimension table indices into a set of one or more dimension tables. The insight engine identifies one of the set of dimension tables. The insight engine performs Operations 304-314 with respect to the identified dimension table.

The insight engine may reiterate Operation 304 to identify each of the set of dimension tables. At each reiteration of Operation 304, Operations 306-314 are also reiterated with respect to each of the set of dimension tables.

One or more embodiments include identifying an attribute value associated with an attribute of the dimension table (Operation 306). The dimension table includes one or more attribute. Each attribute is configured to be populated by a limited set of attribute values. The insight engine identifies one of the attribute values. The insight engine performs Operations 306-314 with respect to the identified attribute value.

The insight engine may reiterate Operation 306 to identify each attribute value associated with the dimension table. As an example, a dimension table may include the attributes, continent and country. A limited set of attribute values, for the continent attribute, may be "North America" and "South America." A limited set of attribute values, for the country attribute, may be "United States," "Canada," and "Mexico." The insight engine may reiterate Operation 306 to identify each of North America," "South America," "United States," "Canada," and "Mexico." The insight engine performs Operations 308-314 with respect to each attribute value.

One or more embodiments include determining whether there are any entries in the fact table associated with the attribute value (Operation 308). The insight engine searches for entries, in the dimension table, that include the attribute value identified at Operation 306. The insight engine identifies the dimension table index associated with each such entry. The insight engine searches for entries, in the fact table, that include one of the identified dimension table indices. If there are no such entries, then there are no entries in the fact table associated with the attribute value. The insight engine may reiterate Operation 306 to identify another attribute value. Conversely, if there is at least one such entry, then there is at least one entry in the fact table associated with the attribute value.

One or more embodiments include identifying a subset of entries that are associated with the attribute value (Operation 310). As described above, the insight engine searches for entries, in the dimension table, that include the attribute value identified at Operation 306. The insight engine identifies the dimension table index associated with each such entry. The insight engine searches for entries, in the fact table, that include one of the identified dimension table indices. The entries in the fact table that include one of the identified dimension table indices forms the subset of entries that are associated with the attribute value.

One or more embodiments include identifying a metric of the fact table (Operation 312). The fact table, identified at Operation 302, includes a set of one or more metrics. The insight engine identifies one of the set of metrics. The insight engine performs Operation 314 with respect to the identified metric.

The insight engine may reiterate Operation 312 to identify each of the set of metrics. At each reiteration of Operation 312, Operation 314 is also reiterated with respect to each of the set of metrics.

One or more embodiments include applying an insight algorithm to the subset of entries, with respect to the metric, in order to determine an insight (Operation 314). A set of one or more insight algorithms may be used to generate insights for a computer system. As described above, examples of insight algorithms include an aggregation algorithm and an outlier algorithm. The insight engine identifies one of the set of insight algorithms.

The insight engine applies the identified insight algorithm to the subset of entries identified at Operation 310. The insight engine applies the identified insight algorithm with respect to the metric identified at Operation 312.

As an example, an insight engine may identify a fact table storing information about communications with a particular node. The insight engine may identify a subset of entries, in the fact table, associated with the "Sales Order Application" attribute value. The insight engine may identify an error count metric in the fact table. The insight engine may identify an aggregation algorithm.

Based on the aggregation algorithm, the insight engine may compute a sum of the error counts corresponding to the subset of entries of the fact table. The sum may be, for example, fifty. This computation indicates that communications, with the particular node, using the "Sales Order Application" resulted in a total of fifty errors.

The insight engine may additionally compute a sum of the error count corresponding to all entries of the fact table. The sum may be, for example, ninety. This computation indicates that communications, with the particular node, resulted in a total of ninety errors.

The insight engine may determine that the communications using the "Sales Order Application" contributed to 55.66% (50/90) of the total number of errors.

In the above example, the insight engine applied the aggregation algorithm, to the subset of entries associated with the "Sales Order Application," with respect to the error count metric in order to obtain one insight. The insight is associated with the metric-attribute value pair comprising the error count and the "Sales Order Application."

The insight algorithm may reiterate Operation 314 to apply each of the set of insight algorithms, to the subset of entries, with respect to the metric. An insight is generated from each application of an insight algorithm.

Based on the above description of FIG. 3, Operations 302-314 may be performed as a series of nested iterations to traverse through each insight algorithm, each metric, each attribute value, and each fact table. Application of each insight algorithm to each metric-attribute value pair generates an insight. Hence, the nested iterations of Operation 302-314 generate a plurality of insights, each corresponding to a tuple of metric-attribute value-insight algorithm.

The following example illustrates the application of a particular insight algorithm, to a particular subset of entries in the fact table, with respect to different metrics.

As an example, an insight engine may identify a fact table storing information about communications with a particular node. The insight engine may identify a subset of entries, in the fact table, associated with the "Sales Order Application" attribute value. The insight engine may identify an error count metric of the fact table. The insight engine may identify an aggregation algorithm.

Based on the aggregation algorithm, the insight engine may compute a sum of the error counts corresponding to the subset of entries of the fact table. The sum may be, for example, fifty. The insight engine may compute a sum of the error count corresponding to all entries of the fact table. The sum may be, for example, ninety. The insight engine may determine that the communications using the Sales Order Application contributed to 55.66% (50/90) of the total number of errors.

The insight engine may determine that no other insight algorithms need to be applied. The insight engine selects a different metric, the response time, of the fact table. Based on the same aggregation algorithm, the insight engine may compute a sum of the response times corresponding to the subset of entries of the fact table. The sum may be, for example, 2 ms. The insight engine may compute a sum of the response times corresponding to all entries of the fact table. The sum may be, for example, 5 ms. The insight engine may determine that the communications using the Sales Order Application contributed to 40% (⅖) of the total response time.

In the above example, the insight engine applied the aggregation algorithm, to the subset of entries associated with the "Sales Order Application" attribute value, with respect to the error count metric in order to obtain one insight. Additionally, the insight engine applied the aggregation algorithm, to the subset of entries associated with the "Sales Order Application" attribute value, with respect to the response time metric in order to obtain another insight.

B. Computing a Score for an Insight

Figure 4:
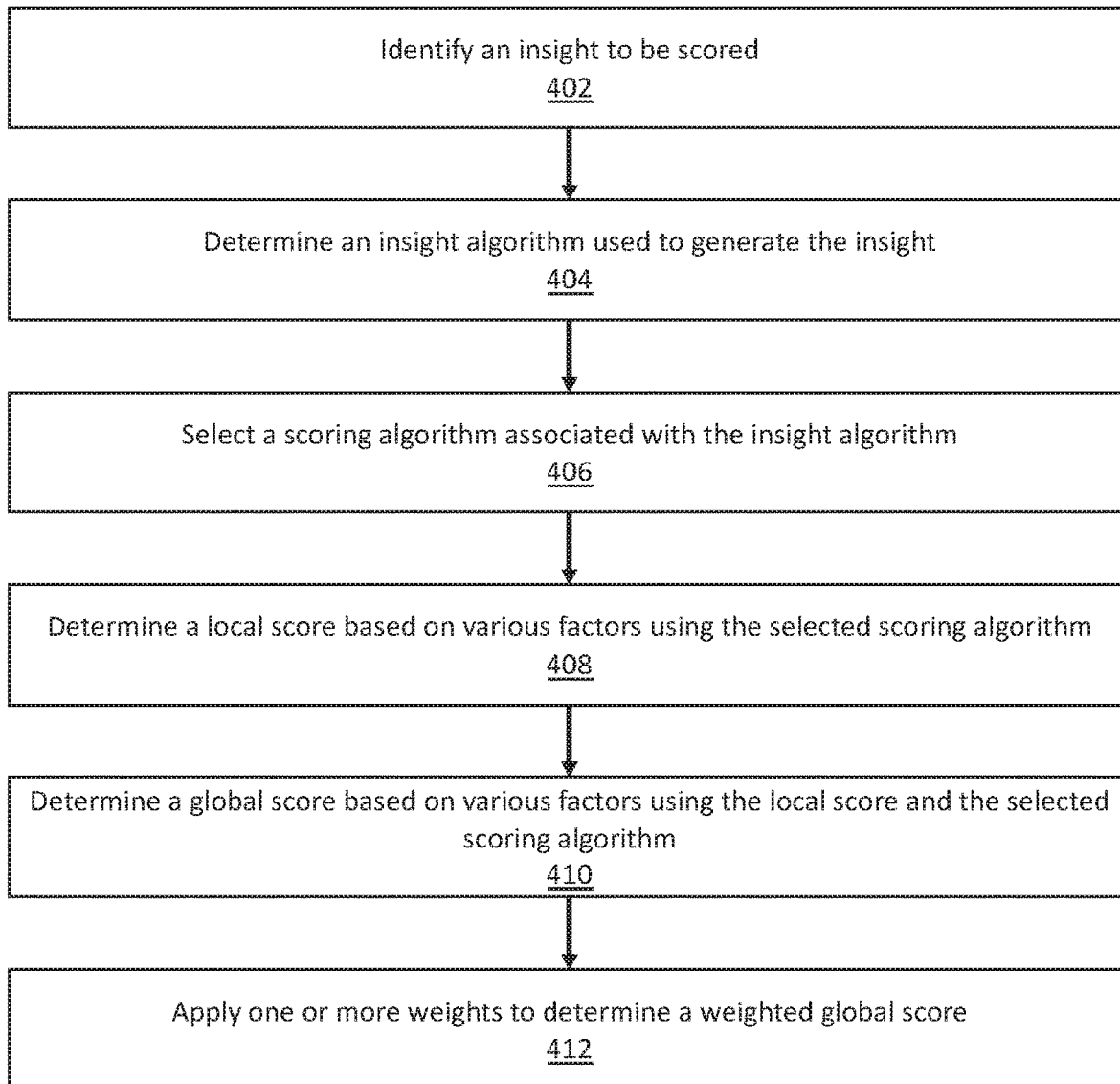
FIG. 4 illustrates an example set of operations for computing a score corresponding to an insight, in accordance with one or more embodiments.

Referring to FIG. 4, an example set of operations for computing a score corresponding to an insight is illustrated.

One or more embodiments include identifying an insight to be scored (Operation 402). The insight to be scored may be one of the plurality of insights generated through the nested iterations of Operations 302-314. Additionally or alternatively, the insight to be scored may be generated based on another insight algorithm. As an example, an insight to be scored may be a trend and/or irregularity associated with a metric over a time period.

One or more embodiments include determining an insight algorithm used to generate the insight (Operation 404). The insight engine determines the insight algorithm used to generate the insight. As an example, an insight that specifies a percentage in which communications associated with a particular attribute value contributed to a particular metric may be generated by an aggregation algorithm.

One or more embodiments include selecting a scoring algorithm associated with the insight algorithm (Operation 406). The insight engine retrieves a mapping between insight algorithms and scoring algorithms from a data repository. Different scoring algorithms may be mapped to different insight algorithms. The insight engine selects the scoring algorithm associated with the insight algorithm identified at Operation 404 based on the mapping.

One or more embodiments include determining a local score based on various factors using the selected scoring algorithm (Operation 408). The various factors for scoring a particular insight may include, for example: (a) a level of irregularity associated with the particular insight; (b) a number of communications with the node of the computer system; and (c) a number of communications with the node of the computer system that are associated with a same attribute value as the particular insight.

As an example, an insight may be generated based on an aggregation algorithm. The aggregation algorithm may be applied to a subset of entries, of a fact table, associated with a particular attribute value. The aggregation algorithm may be applied with respect to a particular metric. As described above, the aggregation algorithm may compute a "Metric Contribution Percentage" for the particular attribute value. The Metric Contribution Percentage represents a level of irregularity associated with the insight.

A local score, for the insight, may be computed based on the Metric Contribution Percentage. Further, the local score may be computed based on a ratio of (a) a number of entries, of the fact table, associated with the particular attribute value to (b) a total number of entries of the fact table. The ratio indicates a percentage of communications that are associated with the particular attribute value. The percentage may be referred to herein as an "AV Contribution Percentage." The AV Contribution Percentage represents a ratio of (a) a number of communications, with a particular node associated with the fact table, that are associated with a same attribute value as the particular insight to (b) a total number of communications with the particular node.

The local score may be computed as a product of (a) the Metric Contribution Percentage and (b) a difference between one-hundred and the AV Contribution Percentage. The local score, for an insight generated by an aggregation algorithm, may be computed based on the following formula:

(Metric Contribution Percentage)×(100−(AV Contribution Percentage)).

As another example, an insight may be generated based on an outlier algorithm. The outlier algorithm may be applied to a subset of entries, of a fact table, associated with a particular attribute value. The outlier algorithm may be applied with respect to a particular metric. As described above, the outlier algorithm may compute a "Metric Outlier Percentage" for the particular attribute value. The Metric Outlier Percentage represents a level of irregularity associated with the insight.

A local score, for the insight, may be computed based on the Metric Outlier Percentage. Further, the local score may be computed based on the AV Contribution Percentage. The local score may be computed as a product of (a) the Metric Outlier Percentage and (b) the AV Contribution Percentage. The local score, for an insight generated by an outlier algorithm, may be computed based on the following formula:

(Metric Outlier Percentage)×(AV Contribution Percentage).

One or more embodiments include determining a global score based various factors using the local score and the selected scoring algorithm (Operation 410). The various factors for scoring a particular insight include, for example: (a) a number of insights associated with a same attribute value as the particular insight; and (b) a total number of insights in the set of insights identified at Operation 204.

As an example, an insight engine may compute a ratio of (a) a number of insights associated with a same attribute value as the insight to be scored to (b) a total number of insights in the set of insights identified at Operation 204. The global score may be a sum of the local score and the computed ratio.

One or more embodiments include applying one or more weights to determine a weighted global score (Operation 412). A weight may be determined based on various factors. Examples of factors for determining weights include user preference, user history, information included in a user profile, a topology graph, and a previously-presented primary anomaly. Additional and/or alternative factors may be used. The insight engine may apply the weight to the global score to determine a weighted global score.

As described above, a user profile may store the user preferences and/or user history of a user. A greater weight may correspond to insights for which the user has indicated a preference in viewing. Additionally or alternatively, a greater weight may correspond to insights for which the user has a history of viewing.

Additionally or alternatively, a topology graph describes an overall architecture, hierarchy, arrangement, setting, and/or usage of nodes of a computer system. The topology graph may show that one node is "connected to" another node, indicating that the two nodes have a relationship with each other. As an example, a computer system may include a database server, which is accessed by a web server. The web server may implement multiple applications. A topology graph, for the computer system, may illustrate the database server connected to the web server. The topology graph may further illustrate the web server connected to each of the applications. In this example, the database server is "directly connected" with the web server. The database server is "indirectly connected" with each of the applications. Further, in this example, the database server may be referred to as being on the "top level" of a hierarchy illustrated by the topology graph. The web server may be referred to as being on the "second level." The applications may be referred to as being on the "third level." Any number of levels may be included in a hierarchy described by a topology graph.

A greater weight may correspond to insights for communications with a particular node that is associated with a larger number of connection, as indicated by a topology graph. Additionally or alternatively, a greater weight may correspond to insights for communications with a particular node that is associated with a higher hierarchical level, as indicated by a topology graph.

As an example, a set of user preferences may indicate that a user prefers to view insights associated with a particular Sales Application. One or more tables may store information associated with communications with a particular node. An attribute, associated with the tables, may be the application that is used to communicate with the particular node. An attribute value, of the attribute, may be "Sales Application." Another attribute, associated with the tables, may be the region from which the communication originated. An attribute value, of the attribute, may be "North America." A set of insights, associated with communications with the particular node, may be generated.

A first insight may indicate that communications associated with "Sales Application" contributed to 75% of the response time. A global score for the insight may be computed as 65. A second insight may indicate that 60% of the communications associated with "North America" have an above-average error count. A global score for the insight may be computed as 75.

Continuing the example, based on the user preferences, a greater weight may be assigned to insights associated with the Sales Application attribute value. The weight may be, for example, 1.2. Since the first insight is associated with the Sales Application, the weight is applied to the first insight. The weight may be multiplied with the global score of the first insight. The weighted global score of the first insight may be computed as 78. Since the second insight is not associated with the Sales Application, the weight is not applied to the second insight. The weighted global score of the second insight may remain the same, which is 75. Hence, the weighted global score of the first insight is greater than the weighted global score of the second insight.

As another example, a topology graph may indicate that a database node is on the top level of a hierarchy. The topology graph may indicate that an application node is on the third level of the hierarchy. One or more tables may store information associated with communications with the database node. One or more other tables may store information associated with communications with the application node.

Continuing the example, a set of insights may include an insight associated with communications with the database node. A global score for the insight may be computed as 70. The set of insights may include another insight associated with communications with the application node. A global score for the insight may be computed as 75.

Continuing the example, a greater weight may be assigned to insights associated with nodes on higher levels, as indicated by the topology graph. The weight for an insight associated with a node on the top level may be, for example, 1.10. The weight for an insight associated with a node on the third level may be, for example, 1.02.

The weight of 1.10 may be applied to the global score of the insight associated with the database node. The weighted global score may be computed as 77.0. The weight of 1.02 may be applied to the global score of the insight associated with the application node. The weighted global score may be computed as 76.5. Hence, the weighted global score of the insight associated with the database node is greater than the weighted global score of the insight associated with the application node.

As another example, a previously-presented primary anomaly may specify that communications originating from Europe contributed to 5% of the total user logins. A first insight to be scored may specify that the change in the number of user logins, from Quarter 2 to Quarter 3, is greater than a specified threshold value. A second insight to be scored may specify that 69% of the communications using a "Safari" browser have an above-average response time. The first insight and the previously-presented primary anomaly are both associated with the user login count metric. The second insight and the previously-presented primary anomaly are not associated with any common factors. Hence, a greater weight may be applied to the score corresponding to the first insight. A lesser weight may be applied to the score corresponding to the second insight.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
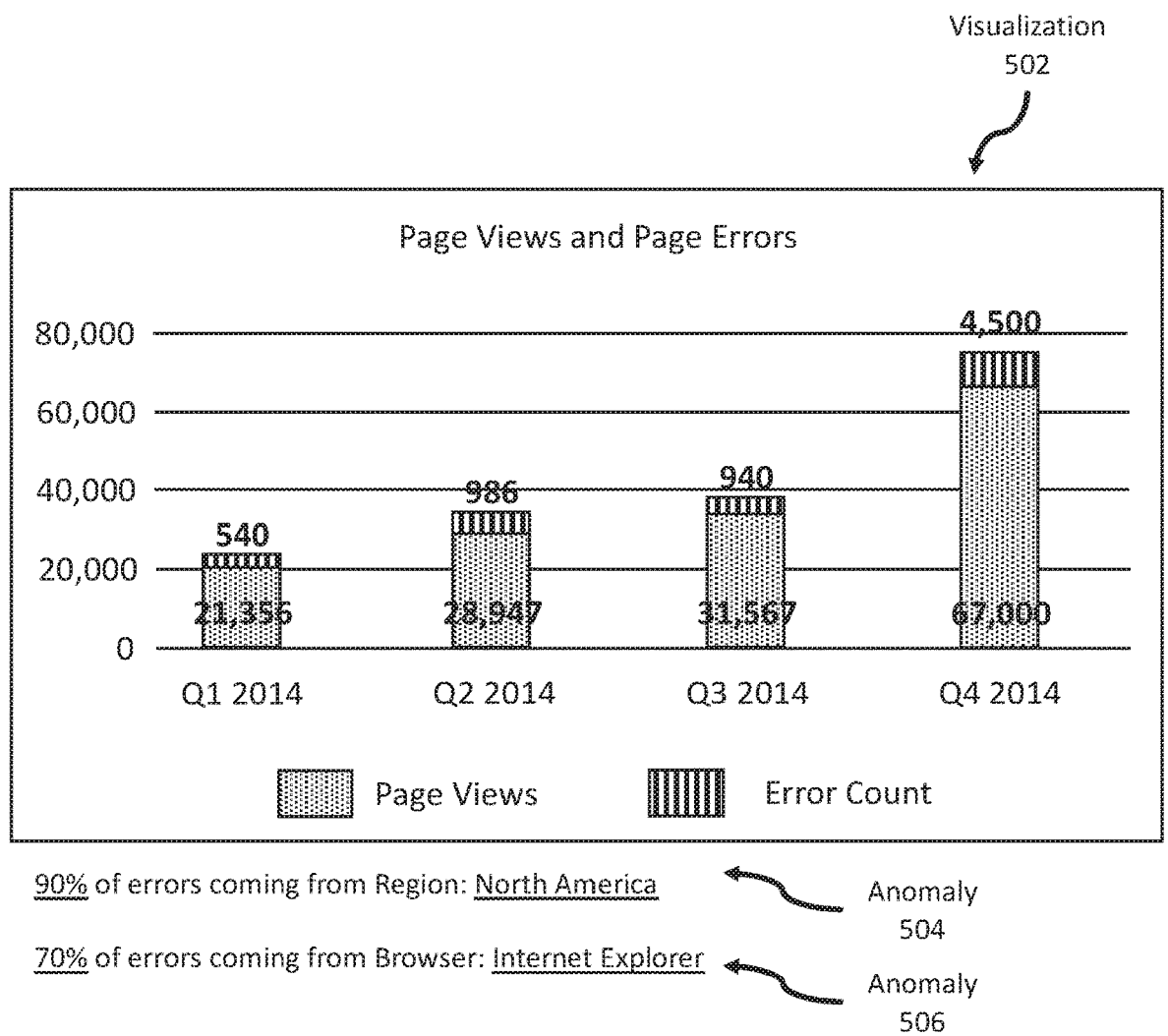
FIGS. 5A-C illustrate an example of a sequence of user interface presenting a series of related primary anomalies, in accordance with one or more embodiments.
Figure 5B:
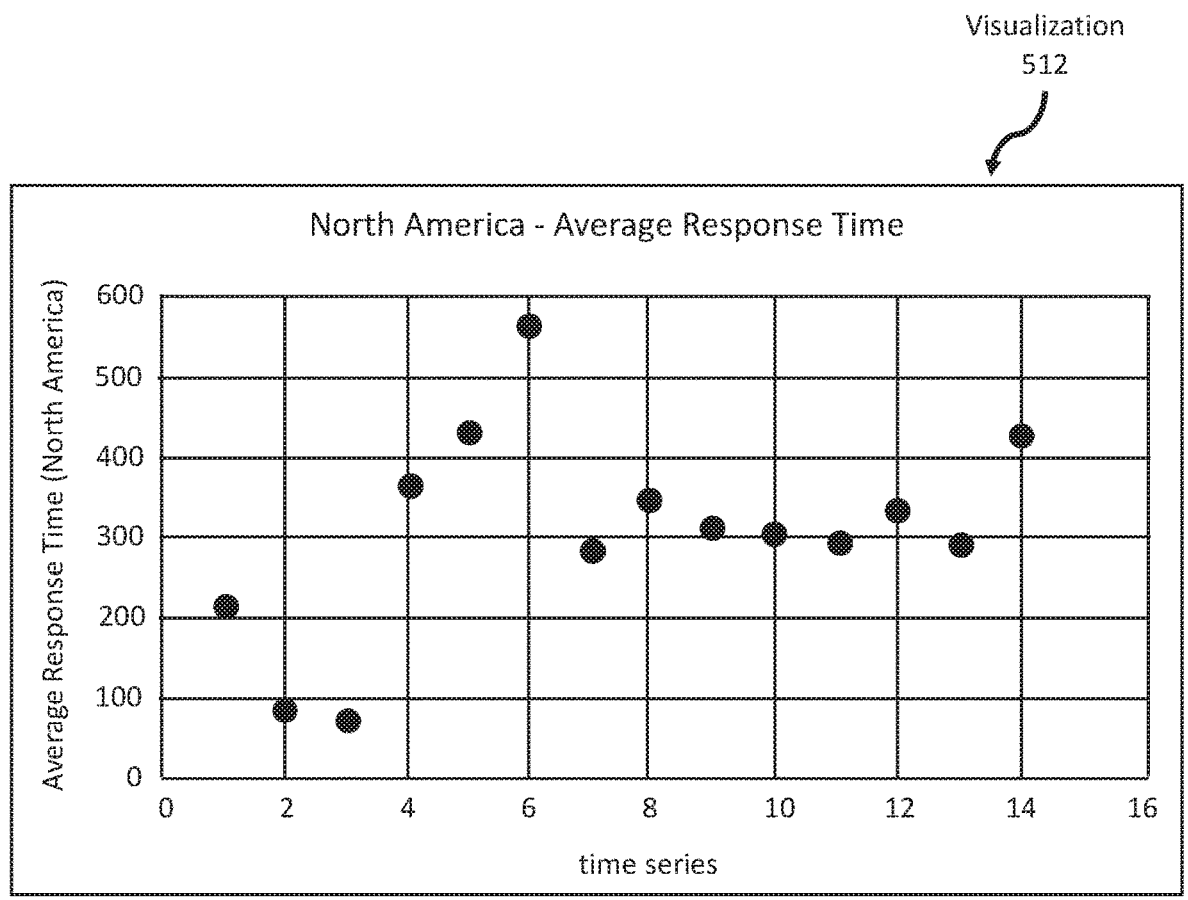
Figure 5C:
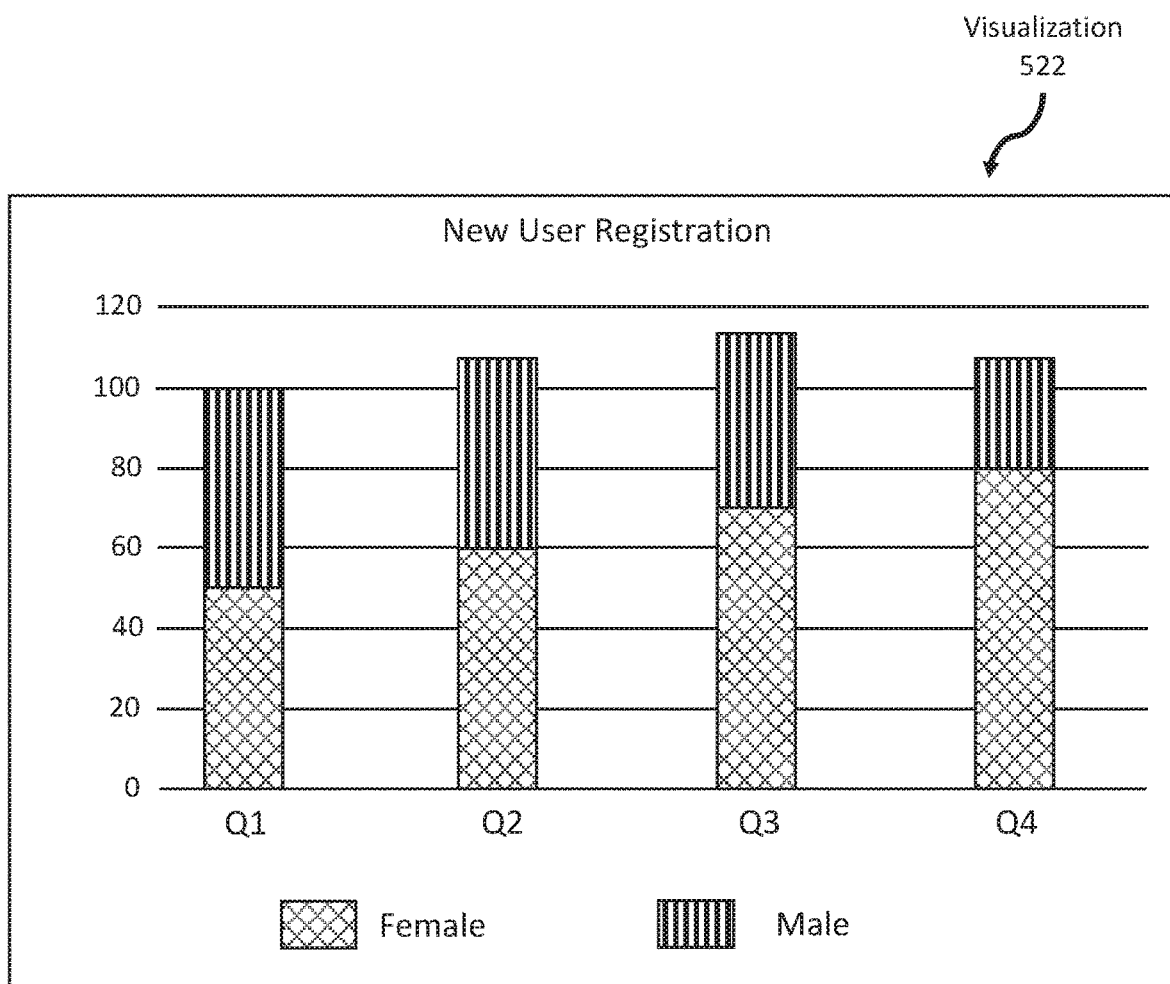

FIGS. 5A-C illustrate an example of a sequence of user interface presenting a series of related primary anomalies, in accordance with one or more embodiments.

An insight engine generates a set of insights based on a set of metrics corresponding to communications with nodes of a computer system. A first insight indicates that 90% of errors are coming from North America. A second insight indicates that 70% of errors are coming from Internet Explorer. The insight engine selects the first insight as primary anomaly 504. The selection of the primary anomaly 504 may be based on a scoring algorithm.

The insight engine selects a visualization associated with the primary anomaly 504. The insight engine analyzes the error count over time. The insight engine determines that the increase in the error count in the last quarter is greater than a specified threshold value. The insight engine determines the page view count metric is related to the error count metric. The insight engine selects a bar chart as visualization 502. The bar chart includes stacked columns. Each column corresponds to a quarter. Each stacked column shows the number of page errors as well as the number of page views during a particular quarter.

The insight engine selects the second insight as secondary anomaly 506. The selection of the secondary anomaly 506 may be based on a scoring algorithm. The insight engine presents the primary anomaly 504 and the secondary anomaly 506 as text below visualization 502. As illustrated in FIG. 5A, visualization 502, primary anomaly 504, and secondary anomaly 506 are presented at a user interface.

The metric and the attribute value associated with each of the primary anomaly 504 and the secondary anomaly 506 are selectable. The metrics and the attribute values may be selected as a particular factor for determining a new context for determining a new primary anomaly 514. A user selects the "North America" attribute value, associated with the primary anomaly 504, as a particular factor for determining a new context.

The insight engine determines that a context for determining the primary anomaly 514 is the "North America" attribute value. The insight engine identifies a subset of insights that are associated with the "North America" attribute value. A first insight indicates that 80% of average response time in North America are higher than an average for all regions. A second insight indicates that there is a 60% rise in user registrations in North America over the last time period. The insight engine selects the first insight as primary anomaly 514. The selection of the primary anomaly 514 may be based on a scoring algorithm.

The insight engine selects a visualization associated with the primary anomaly 514. A mapping between visualizations and insight algorithms is stored in a data repository. Based on the mapping, the insight engine determines that a visualization associated with the insight algorithm, used for generating the primary anomaly 514, is a scatter plot. The insight engine plots the average response time, corresponding to North America, over time in the scatter plot.

The insight engine selects the second insight as secondary anomaly 516. The selection of the secondary anomaly 516 may be based on a scoring algorithm. The insight engine presents the primary anomaly 514 and the secondary anomaly 516 as text below visualization 512. As illustrated in FIG. 5B, visualization 512, primary anomaly 514, and secondary anomaly 516 are presented at the user interface.

The metric and the attribute value associated with each of the primary anomaly 514 and the secondary anomaly 516 are selectable. The metrics and the attribute values may be selected as a particular factor for determining a new context for determining a new primary anomaly 524. A user selects "60% rise in user registration," associated with the secondary anomaly 516, as a particular factor for determining a new context.

The insight engine determines that a context for determining the primary anomaly 524 is the "user registration count" metric. The insight engine identifies a subset of insights that are associated with both (a) the "North America" attribute value (which was previously selected as a context for determining primary anomaly 514) and (b) the "user registration count" metric. A first insight indicates that 73% of new user registrations in North America are from Female users. A second insight indicates that 70% of new user registrations in North America are coming from California. The insight engine selects the first insight as primary anomaly 524. The selection of the primary anomaly 524 may be based on a scoring algorithm.

The insight engine selects a visualization associated with the primary anomaly 524. A mapping between visualizations and attributes is stored in a data repository. Based on the mapping, the insight engine determines that a visualization associated with the "Gender" attribute, associated with the primary anomaly 524, is a bar chart. The insight engine plots the number of new user registrations per quarter in the bar chart. Each stacked column of the bar chart shows the number of Female users and the number Male users.

The insight engine selects the second insight as secondary anomaly 526. The selection of the secondary anomaly 526 may be based on a scoring algorithm. The insight engine presents the primary anomaly 524 and the secondary anomaly 526 as text below visualization 522. As illustrated in FIG. 5C, visualization 522, primary anomaly 524, and secondary anomaly 526 are presented at the user interface.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
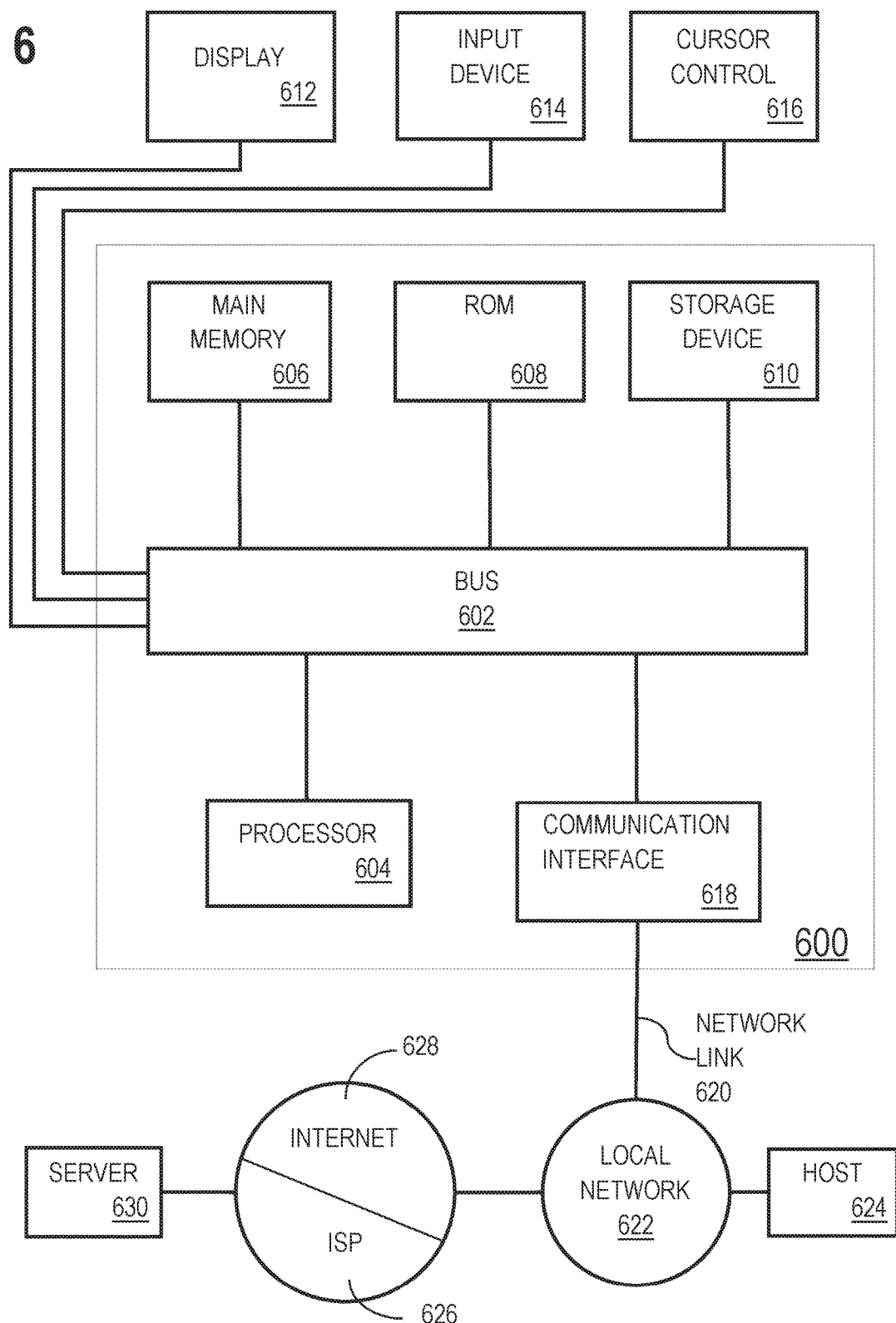
FIG. 6 shows a block diagram that illustrates a computer system, in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    identifying a set of one or more tables storing information corresponding to communications with one or more nodes of a computer system;
        wherein the information corresponding to the communications with the nodes comprises a set of metrics and a set of attribute values;
    determining a first anomaly associated with a first metric of the set of metrics and a first attribute value of the set of attribute values;
    presenting, on a graphical user interface, a first set of information representing the first anomaly;
    receiving a first selection of at least a first portion of the first set of information, wherein the first portion of the first set of information is associated with a first factor comprising at least one of the first metric and the first attribute value;
    responsive to receiving the first selection of the first portion of the first set of information:
        determining a first context, for identifying a second anomaly, based on the first factor;
        wherein the first context comprises one of:
            (a) the first factor, and
            (b) at least a subset of the set of tables, each of the subset of the set of tables being associated with the first factor;
        identifying a subset of the set of metrics associated with the first context;
    determining the second anomaly based on at least the subset of the set of metrics associated with the first context, without using any metric of the set of metrics that is not associated with the first context;
    presenting, on the graphical user interface, a second set of information representing the second anomaly.

2. The one or more media of claim 1, further storing instructions which, when executed by the one or more processors, cause:
    receiving a second selection of at least a second portion of the second set of information;
    responsive to receiving the second selection of the second portion of the second set of information:
        determining a second context, for identifying a third anomaly, based on the second portion of the second set of information;
        determining the third anomaly based on at least a second subset of the set of metrics that is associated with the second context, without using any metric of the set of metrics that is not associated with the second context;
        presenting, on the graphical user interface, a third set of information representing the third anomaly.

3. The one or more media of claim 1, further storing instructions which, when executed by the one or more processors, cause:
    receiving a second selection of at least a second portion of the second set of information;
    responsive to receiving the second selection of the second portion of the second set of information:
        determining a second context, for identifying a third anomaly, based on the second portion of the second set of information;
        determining the third anomaly based on at least a second subset of the set of metrics that is associated with at least the first context and the second context, without using any metric of the set of metrics that is not associated with the first context and the second context;
        presenting, on the graphical user interface, a third set of information representing the third anomaly.

4. The one or more media of claim 1, wherein the first portion of the first set of information comprises a textual representation.

5. The one or more media of claim 1, wherein the first portion of the first set of information comprises a visualization.

6. The one or more media of claim 1, wherein determining the second anomaly based on at least the second subset of the set of metrics that is associated with the first context, without using any metric of the set of metrics that is not associated with the first context comprises:
    applying an insight algorithm to entries in the subset of the set of fact tables to generate a candidate set of anomalies;
    selecting one of the candidate set of anomalies as the second anomaly.

7. The one or more media of claim 1, wherein:

the set of tables includes a set of one or more dimension tables and a set of one or more fact tables:
the first portion of the first set of information comprises the first attribute value; and
determining the first context, for identifying the second anomaly, based on the first portion of the first set of information comprises:
determining that a subset of the set of dimension tables includes the first attribute value;
determining that a subset of the set of fact tables index into the subset of the set of dimension tables;
determining that the first context includes the subset of the set of fact tables without including any other fact tables of the set of fact tables.

8. The one or more media of claim 1, wherein:
the first portion of the first set of information comprises the first attribute value; and
determining the first context, for identifying the second anomaly, based on the first portion of the first set of information comprises:
determining that the subset of the set of tables includes a set of entries associated with the first attribute value;
determining that the first context includes the subset of the set of tables without including any other tables of the set of tables.

9. The one or more media of claim 1, wherein determining the second anomaly based on at least the subset of the set of metrics that is associated with the first context, without using any metric of the set of metrics that is not associated with the first context comprises:
applying an insight algorithm to a set of entries, in the set of tables, associated with the first attribute value to generate a candidate set of anomalies, without applying the insight algorithm to any entries not associated with the first attribute value;
selecting one of the candidate set of anomalies as the second anomaly.

10. The one or more media of claim 1, wherein each entry in the subset of the set of fact tables corresponds to a respective communication with a node of the computer system.

11. The one or more media of claim 1, wherein:
the set of tables includes a set of one or more dimension tables and a set of one or more fact tables;
determining the first context, for identifying the second anomaly, based on the first portion of the first set of information comprises:
determining that a subset of the set of dimension tables includes an attribute associated with the first attribute value;
determining that a subset of the set of fact tables index into the subset of the set of dimension tables;
determining that the first context includes the subset of the set of fact tables without including any other fact tables of the set of fact tables.

12. The one or more media of claim 1, wherein determining the first anomaly comprises:
applying an insight algorithm to at least a second subset of the set of metrics;
wherein the insight algorithm comprises at least one of: an analysis of a metric over time, an aggregation algorithm, an outlier algorithm.

13. The one or more media of claim 1, wherein presenting, on the graphical user interface, the first set of information representing the first anomaly comprises:
determining that an insight algorithm used for determining the first anomaly corresponds to a particular visualization of a set of visualizations;
using the particular visualization to present the first set of information representing the first anomaly.

14. A system, comprising:
one or more devices respectively including one or more hardware processors; and
the system being configured to perform operations comprising:
identifying a set of one or more tables storing information corresponding to communications with one or more nodes of a computer system;
wherein the information corresponding to the communications with the nodes comprises a set of metrics and a set of attribute values;
determining a first anomaly associated with a first metric of the set of metrics and a first attribute value of the set of attribute values;
presenting, on a graphical user interface, a first set of information representing the first anomaly;
receiving a first selection of at least a first portion of the first set of information, wherein the first portion of the first set of information is associated with a first factor comprising at least one of the first metric and the first attribute value;
responsive to receiving the first selection of the first portion of the first set of information:
determining a first context, for identifying a second anomaly, based on the first factor;
wherein the first context comprises one of:
(a) the first factor, and
(b) at least a subset of the set of tables, each of the subset of the set of tables being associated with the first factor;
identifying a subset of the set of metrics associated with the first context;
determining the second anomaly based on at least the subset of the set of metrics associated with the first context, without using any metric of the set of metrics that is not associated with the first context;
presenting, on the graphical user interface, a second set of information representing the second anomaly.

15. The system of claim 14, wherein:
the set of tables includes a set of one or more dimension tables and a set of one or more fact tables;
the first portion of the first set of information comprises the first attribute value; and
determining the first context, for identifying the second anomaly, based on the first portion of the first set of information comprises:
determining that a subset of the set of dimension tables includes the first attribute value;
determining that a subset of the set of fact tables index into the subset of the set of dimension tables;
determining that the first context includes the subset of the set of fact tables without including any other fact tables of the set of fact tables.

16. The system of claim 14, wherein:
the first portion of the first set of information comprises the first attribute value; and
determining the first context, for identifying the second anomaly, based on the first portion of the first set of information comprises:
determining that the subset of the set of tables includes a set of entries associated with the first attribute value;

determining that the first context includes the subset of the set of tables without including any other tables of the set of tables.

17. The system of claim 14 wherein determining the second anomaly based on at least the subset of the set of metrics that is associated with the first context, without using any metric of the set of metrics that is not associated with the first context comprises:
applying an insight algorithm to a set of entries, in the set of tables, associated with the first attribute value to generate a candidate set of anomalies, without applying the insight algorithm to any entries not associated with the first attribute value;
selecting one of the candidate set of anomalies as the second anomaly.

18. A method, comprising:
identifying a set of one or more tables storing information corresponding to communications with one or more nodes of a computer system;
wherein the information corresponding to the communications with the nodes comprises a set of metrics and a set of attribute values;
determining a first anomaly associated with a first metric of the set of metrics and a first attribute value of the set of attribute values;
presenting, on a graphical user interface, a first set of information representing the first anomaly;
receiving a first selection of at least a first portion of the first set of information, wherein the first portion of the first set of information is associated with a first factor comprising at least one of the first metric and the first attribute value;
responsive to receiving the first selection of the first portion of the first set of information:
determining a first context, for identifying a second anomaly, based on the first factor;
wherein the first context comprises one of:
(a) the first factor, and
(b) at least a subset of the set of tables, each of the subset of the set of tables being associated with the first factor;
identifying a subset of the set of metrics associated with the first context;
determining the second anomaly based on at least the subset of the set of metrics associated with the first context, without using any metric of the set of metrics that is not associated with the first context;
presenting, on the graphical user interface, a second set of information representing the second anomaly;
wherein the method is performed by one or more devices respectively including one or more hardware processors.

19. The one or more media of claim 1, wherein identifying the subset of the set of metrics associated with the first context comprises:
determining that the subset of the set of metrics are included in the subset of the set of tables.

20. The one or more media of claim 1, wherein the subset of the set of metrics comprises the first metric.

* * * * *

UNITED STATES PATENT AND TRADEMARK OFFICE
CERTIFICATE OF CORRECTION

PATENT NO. : 10,818,052 B2  
APPLICATION NO. : 16/549390  
DATED : October 27, 2020  
INVENTOR(S) : Poduri et al.

Page 1 of 1

It is certified that error appears in the above-identified patent and that said Letters Patent is hereby corrected as shown below:

In the Specification

In Column 4, Line 30, delete ""March"" and insert -- "March". --, therefor.

In the Claims

In Column 28, Line 63, in Claim 6, after "of" delete "fact".

In Column 29, Line 2, in Claim 7, delete "tables:" and insert -- tables; --, therefor.

In Column 29, Line 13, in Claim 7, delete "tables" and insert -- tables, --, therefor.

In Column 29, Line 26, in Claim 8, delete "tables" and insert -- tables, --, therefor.

In Column 29, Line 41, in Claim 10, after "of" delete "fact".

In Column 29, Line 56, in Claim 11, delete "tables" and insert -- tables, --, therefor.

In Column 30, Line 57, in Claim 15, delete "tables" and insert -- tables, --, therefor.

In Column 31, Line 2, in Claim 16, delete "tables" and insert -- tables, --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*